UNITED STATES PATENT OFFICE.

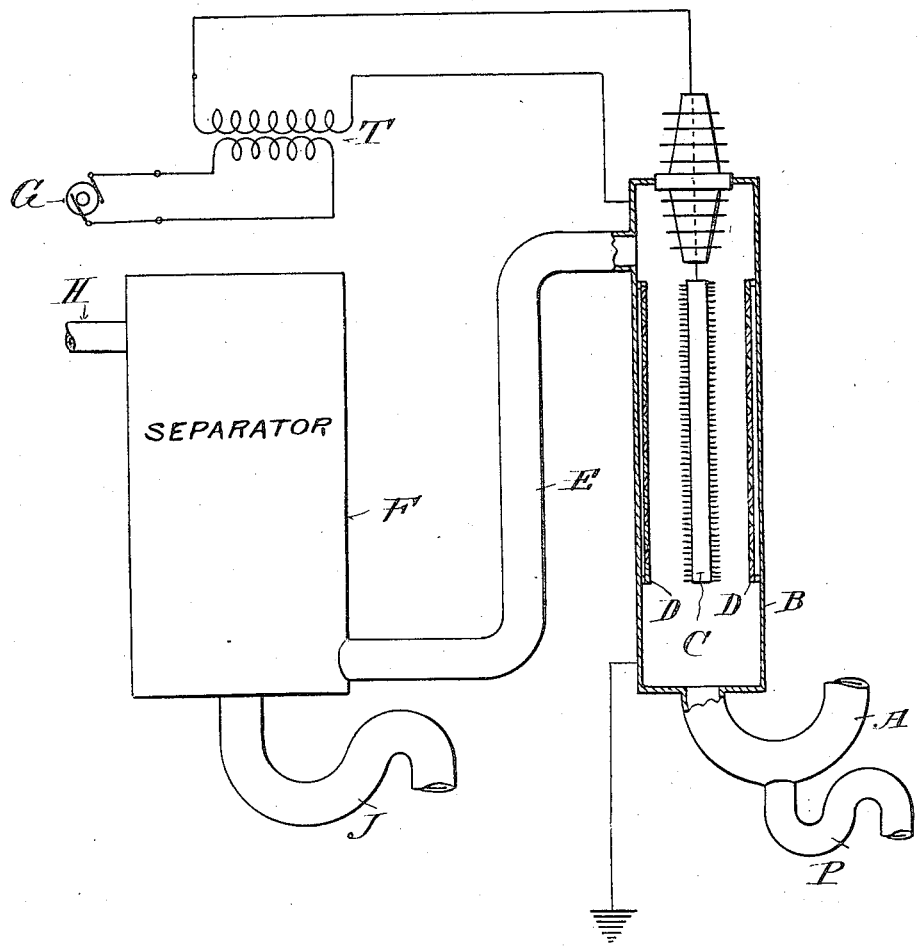

FRANK W. STEERE, OF DETROIT, MICHIGAN, ASSIGNOR TO SEMET-SOLVAY COMPANY, OF SOLVAY, NEW YORK, A CORPORATION OF PENNSYLVANIA.

ART OF REMOVING TAR FROM GAS.

1,130,213.

Specification of Letters Patent. Patented Mar. 2, 1915.

Application filed January 7, 1914. Serial No. 810,906.

*To all whom it may concern:*

Be it known that I, FRANK W. STEERE, a citizen of the United States, residing at Detroit, in the county of Wayne and State of Michigan, have invented certain new and useful Improvements in the Art of Removing Tar from Gas, of which the following is a specification.

While my invention may be applied generally to the separation from a gas of any material carried in suspension therein and of such a nature that minute particles thereof may be caused to aggregate into larger particles or globules, it is more particularly intended to be applied to the removal from the gas resulting from the destructive distillation of coal, as in the operation of retort coke ovens, or other similar gases, of the tar which, in the form of minute particles, or tar-mist, is set free or formed with the gas and carried along therewith. The removal of this tar is an essential step in the preparation of retort coke oven gas for commercial use and the recovery of its elements of value. Various means have been employed for the purpose, such as scrubbing the gas in or spraying it with liquid tar, cooling it to various temperatures, by passing it through or showering it with water, causing a mechanical impact of the tar upon surfaces as in rotary separators, etc., and many combinations of these methods, most of them involving costly apparatus and careful manipulation, have been employed without, however, satisfactorily solving the problem of completely freeing the gas from tar in an economical manner and without loss of constituents of value.

Heretofore the application of electricity in the shape of a brush or silent discharge as a means of removing dry, pulverulent material from gas has been described in many patents and to some extent practised. While it has been known and stated that alternating electric discharges will effect the agglomeration of liquid particles suspended in a relatively quiescent medium, as fog in the open air, it has been insisted by all authorities that the practical application of an electric discharge to the removal of suspended matter from a moving stream of gas on a commercial scale requires the employment of a direct current, notwithstanding the fact that the use of an alternating current, if feasible, would present positive advantages due to the high difference of potential required and the loss of efficiency from rectification. I have discovered, however, in the course of a long continued series of experiments on a large scale, and my invention is based on the fact, that, contrary to the opinion heretofore universally held, when a stream of gas containing tar mist is passed, even with great rapidity, through an alternating electric field the minute particles of tar are caused to coalesce or aggregate to such an extent that they can afterward be easily thrown out of the gas or caused to deposit by gravity to an extent not attainable by any of the methods heretofore employed.

In practising my invention I do not aim to cause tar to be deposited directly by the electrical action or within the electrical field, though some incidental deposition may take place at this point, but aim to cause the gas stream to pass the electrodes at such speed that, while operative coalescence or aggregation of the tar particles shall take place within the field, as nearly as possible all the coalesced particles shall be carried along with it out of the field to be afterward deposited. In this way the electrodes are kept relatively clean and short circuiting through falling streams of tar is prevented. After passing through the electrical field the tar is removed from the gas mechanically as by passing the gas through some form of apparatus wherein the tar is removed by impact upon the opposing surfaces as through a grid, or through a rotary separator against the sides of which it is thrown by centrifugal force. In either case the tar is much more readily arrested and held by the contacting surfaces, because of the greater size of the particles and their consequently decreased surface tension than when it is subjected to the same action in its original shape of fine mist, and a most complete cleansing of the gas is effected.

The invention will be best understood by reference to the accompanying drawing which is a diagrammatic indication of a form of apparatus which may be used in carrying the process into effect.

Referring to the drawing, A, indicates a gas-way leading from a source of gas, through which the gas to be treated passes to a chamber, B. Centrally located within the chamber, B, and depending from suitable supports is a discharging electrode, C, the surface of which is provided with fine points adapted to give a brush discharge under suitable current conditions. Any usual or suitable material may be employed for the electrode though I prefer an electrode having a surface and discharging points of coke as described in an application for Letters Patent filed by me June 10, 1914, Serial No. 804,226. Within the chamber, B, and electrically connected to the wall thereof is a cylindrical receiving electrode, D, formed of metal and having a smooth receiving surface all parts of which are approximately equally distant from the discharging surface of the electrode, C. The electrode, C, is connected to one of the terminals of the secondary coil of a step-up transformer, T, the other terminal of which is connected to the wall of the chamber, B, which is grounded. The primary coil of the transformer, T, receives current from an alternating current generator, G. The coils of the transformer, T, are so proportioned and a current of such potential is delivered from the generator, G, that a high difference of potential exists between the electrodes and a brush discharge is produced from the points of the electrode, C, the electrodes being so spaced apart as to provide sufficient space for the passage of the volume of gas to be treated at a proper velocity, having regard to the production of an effective electric field with the E. M. F. employed.

In practice with the electrodes separated three and one-half inches, I have employed a current of from forty thousand to fifty thousand volts and have caused the gas to pass the electrodes with a linear velocity of ten feet per second with desirable results. These figures may, however, be varied to a considerable degree within the scope of my invention though the gas is always caused to pass with such velocity as to carry along with it the bulk of the tar originally contained in the gas, though some incidental deposition thereof in the chamber, B, will take place.

Such tar as may be deposited in the chamber, B, is drawn off from the bottom through a trapped pipe, P, to be disposed of as desired.

From the chamber, B, the gas passes by a pipe, E, to a device adapted to cause impact of the coalesced particles of tar with or upon a receiving surface. Various mechanical arrangements which will readily occur to those skilled in the art may be used for this purpose. In practice I have employed a Pelouze and Audouin separator, indicated at F, in which the gas is passed through apertures and the tar particles are thrown against an opposed surface. Any other form of device in which the tar particles are caused to come in contact with a receiving surface may, however, be employed. In a rotary separator the relatively heavy coalesced bodies of tar are readily thrown out of the gas by centrifugal action, and in any case they readily cling to any surface with which they come in contact. In this manner a most complete separation of the tar from the gas is effected. From the separator, F, the gas passes on through pipe, H, to be collected and treated in any usual or desired manner, while the accumulated tar is drawn off through pipe J.

If desired the gas may while passing through the impact apparatus or subsequently thereto be showered or washed with water to remove constituents other than the tar which have not been aggregated by the electrical action and are not deposited in the same manner as the tar. Such washing, however, is not required for the deposition of the tar which is entirely removed by its impact upon the opposed surfaces and is recovered in a peculiarly pure and limpid condition.

I am aware that the process of removing tar from gas by causing it to come in contact with a solid surface, as in a grid-like structure, or rotary separator, has been heretofore practised. In all such cases, however, the tar has been caused to impact upon the contacting surface while still in the form of a fine mist or fog, and for this reason it has been possible to effect only an approximately complete separation upon a commercial scale of working, even though a very extensive contacting surface is employed. By causing an increase in the weight and adhesiveness of the individual tar particles before bringing them in contact with the receiving surface, however, I am able to rapidly effect a practically complete separation with a compact and relatively inexpensive form of apparatus, and with a comparatively small differential pressure to effect the movement of the gas.

What I claim as new and desire to secure by Letters Patent is:

1. The improvement in the art of removing tar and similar suspended particles from gas which consists in causing an agglomeration of the particles by moving the gas through an electric field of alternating polarity, removing the gas while holding the agglomerated particles in suspension from such field and afterward separating the particles from the gas.

2. The improvement in the art of removing tar and similar suspended particles from gas which consists in causing an agglomeration of the particles by subjecting them to the action of a brush discharge in an electric field of alternating polarity, moving the gas through the field at such speed that the particles are removed from the field with the gas and afterward separating the particles from the gas.

3. The improvement in the art of removing tar and similar suspended particles from gas which consists in subjecting the particles to the action of a brush discharge in an electric field of alternating polarity, moving the gas through the field at such speed that the particles are removed from the field with the gas and afterward separating the particles from the gas.

In testimony whereof, I have hereunto subscribed my name, this 31 day of December, A. D. 1913.

FRANK W. STEERE.

Witnesses:
HARVEY L. CORWIN,
WARREN S. BLAUVELT.